United States Patent [19]

Fitzgerald

[11] Patent Number: 4,525,739
[45] Date of Patent: Jun. 25, 1985

[54] TELEVISION RECEIVER POWER SUPPLY REGULATION RESPONDING TO BEAM CURRENT CHANGES

[75] Inventor: William V. Fitzgerald, Indianapolis, Ind.

[73] Assignee: RCA Corporation, Princeton, N.J.

[21] Appl. No.: 480,514

[22] Filed: Mar. 30, 1983

Related U.S. Application Data

[63] Continuation-in-part of Ser. No. 451,904, Dec. 21, 1982, abandoned.

[51] Int. Cl.³ .................................................. H04N 3/18
[52] U.S. Cl. ....................................... 358/190; 315/411
[58] Field of Search .................. 358/190, 243; 363/21, 363/25, 26; 315/364, 387, 408, 411

[56] References Cited

U.S. PATENT DOCUMENTS

| | | | |
|---|---|---|---|
| 4,104,567 | 8/1978 | Peer et al. | 315/387 |
| 4,118,739 | 10/1978 | Umehara | 358/190 |
| 4,298,829 | 11/1981 | Luz | 315/408 |
| 4,302,803 | 11/1981 | Shelly | 363/20 |

OTHER PUBLICATIONS

U.S. patent application Ser. No. 445,776, Filed Nov. 30, 1982, J. E. Hicks, "Shutdown Circuit for a Switching Regulator in a Remote Controlled Television Receiver", Assigned to RCA.

*Primary Examiner*—John C. Martin
*Assistant Examiner*—Michael D. Parker
*Attorney, Agent, or Firm*—Paul J. Rasmussen; Peter M. Emanuel; Scott J. Stevens

[57] ABSTRACT

The raster scanned by a television receiver deflection circuit is subject to an increase in size resulting from a decrease in high voltage level caused by increasing electron beam current. The receiver comprises a switched mode power supply producing a voltage supply that is used to power the deflection circuit and generate the high voltage. The voltage supply level incorporates an ac ripple component caused by loading on the supply due to increasing beam current. A peak detector senses the peak level of the voltage supply and applies it to a regulator control circuit which maintains the peak level of the supply voltage constant. Increasing beam current loads the supply, decreasing the average dc voltage level applied to the deflection circuit, thereby decreasing the electron beam scan to compensate for a reduction in high voltage level.

12 Claims, 1 Drawing Figure

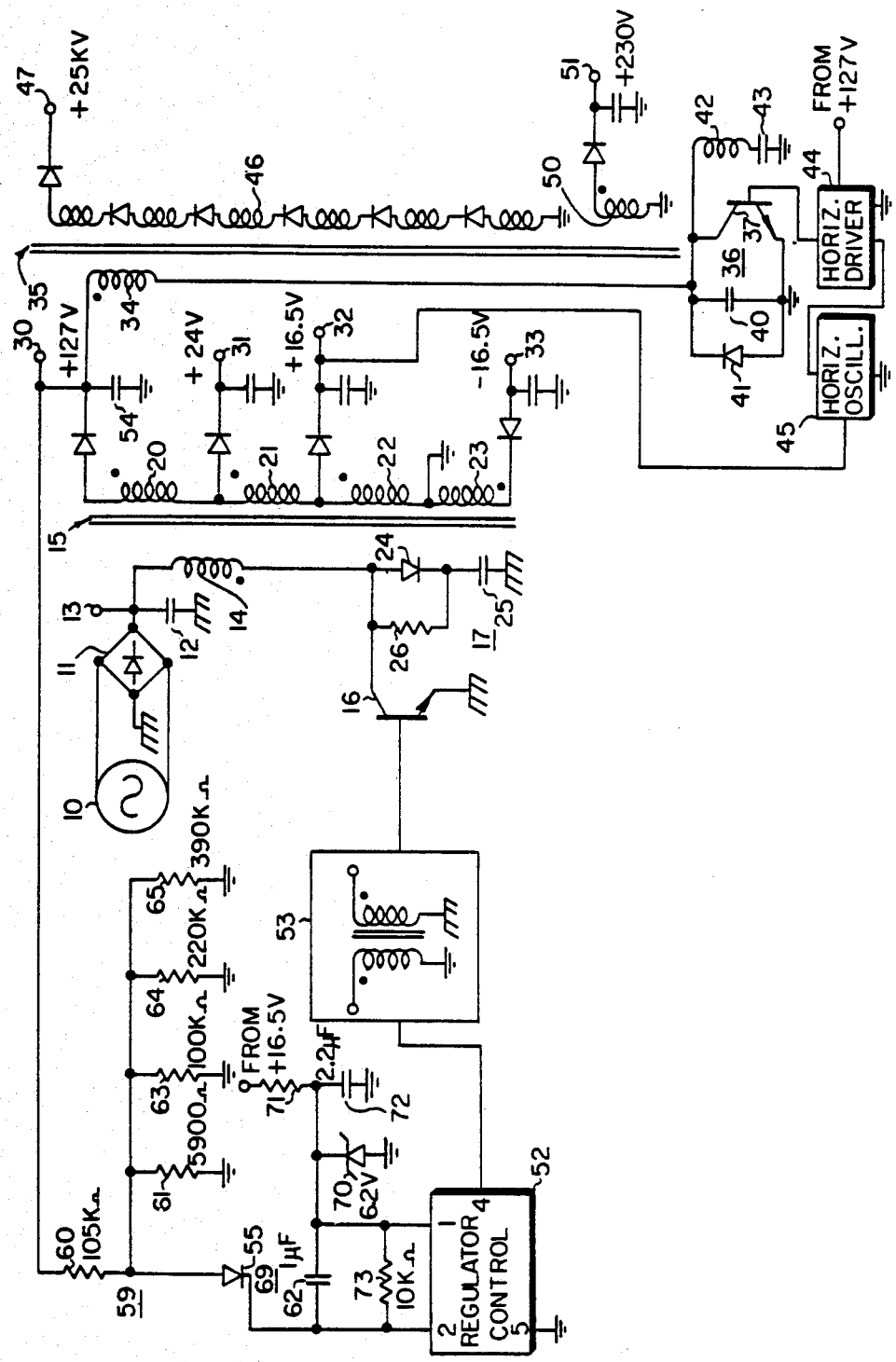

TELEVISION RECEIVER POWER SUPPLY REGULATION RESPONDING TO BEAM CURRENT CHANGES

The following is a continuation-in-part of application Ser. No. 451,904, now abandoned, filed Dec. 21, 1982, in the name of the same inventor.

This invention relates to power supplies for television receivers and in particular to power supplies which provide a regulated output voltage controlled in response to variations in output circuit loading.

A television receiver power supply is required to provide one or more accurately regulated voltages to insure reliable operation of the load circuits powered from the supply. Uncontrolled variations in the load circuit supply voltage may result in undesirable visual or aural distortion of the reproduced television signal.

One type of power supply comprises a transformer having a primary winding coupled by a switch to a source of unregulated voltage, commonly derived from the ac mains supply. Conduction of current from the unregulated supply through the primary winding at horizontal deflection rate intervals causes voltages to be induced across the transformer secondary windings by transformer action. These induced voltages are rectified and filtered to produce supply voltages for various receiver load circuits. The level of the secondary or load circuit voltages is monitored and used to control the operation of the primary winding switch in order to control the conduction interval of the primary winding so as to maintain the secondary voltages at a constant regulated level.

Notwithstanding the previously described need to maintain regulation of the load circuit voltages, under certain circumstances it may be desirable to adjust the level of one or more of the load circuit supply voltages in response to particular receiver operating conditions. In particular, if the reproduced scene brightness increases or the receiver brightness control is adjusted to increase brightness, the scanning electron beam current is increased. Increase in electron beam current causes an increase in current flow in the high voltage winding that provides the ultor or anode potential to the kinescope. This increased current flow causes losses in the winding to increase due to transformer leakage inductance and resistive losses in the rectifying diodes, thereby causing a decrease in the high voltage level.

A decrease in the high voltage or electron beam accelerating potential results in the electron beams traversing the distance between the electron gun and the kinescope display screen at a slower rate. The deflection fields, in particular the horizontal deflection field, therefore act on each electron for a greater length of time, causing the scanned raster to increase in size. If the program material has abrupt or extreme changes in scene brightness, the picture may vary in size in a noticeable and annoying manner. It is important therefore to reduce the level of the deflection circuit supply voltage to decrease the size of the scanned raster in response to increased beam current.

One solution to this problem includes providing a beam current information feedback path to the voltage regulator control circuit to decrease the regulated voltage level of the deflection circuit supply as beam current increases. This arrangement may cause other receiver circuit supply voltages to decrease, necessitating additional voltage regulation circuitry for these supplies, thereby increasing the cost and complexity of the receiver. Another solution utilizes a resistor in series with the power transformer primary winding and the regulated B+ supply. An increase in beam current will load the B+ supply, increasing current flow in the primary winding, which will cause a voltage drop across the resistor, resulting in a decrease in the regulated B+ voltage level. This solution undesirably increases power dissipation of the receiver.

The present invention is directed to a power supply which reduces deflection circuit supply voltage in response to a decrease in high voltage without causing undesirable interaction with other load circuit voltage supplies and without increasing the power dissipation of the receiver.

In accordance with the present invention, a television receiver incorporates a power supply which provides a number of load circuit voltage supplies. One of the supplies is used to generate a high voltage level, which is subject to being reduced in response to increasing beam current.

A deflection circuit is also energized from the high voltage generating supply and provides a deflection current for deflecting one or more electron beams, with the level of the deflection current determined by the average dc level of the deflection circuit supply voltage. A control circuit, responsive to a sensed voltage level, controls the operation of the power supply to maintain the levels of the voltage supplies substantially constant. The high voltage generating and deflection circuit supply voltage is sensed by a peak detector circuit which provides a voltage to the control circuit representative of the peak level of the supply voltage. The average dc level of the deflection circuit supply voltage decreases in response to increasing beam current in order to compensate the electron beam deflection current for the reduction in the high voltage level.

In the accompanying drawing, the sole FIGURE is a schematic and block diagram of a portion of a television receiver including a power supply constructed in accordance with the present invention.

Operating power for the circuit shown in the FIGURE is provided from an ac mains supply 10 which is coupled to a bridge rectifier 11 and a filter capacitor 12 to develop a source of unregulated direct voltage at a terminal 13. This unregulated voltage is applied to one terminal of a primary winding 14 of a power transformer 15. The other terminal of primary winding 14 is coupled to a switching transistor 16 and to a snubber network 17 so that conduction of transistor 16 causes current from the unregulated supply to flow in primary winding 14. This current flow causes energy to be stored in the inductance of winding 14 which is transferred to the secondary windings 20, 21, 22 and 23 of transformer 15 when transistor 16 becomes nonconductive. Due to imperfect magnetic coupling between primary winding 14 and the secondary windings, some energy remains in primary winding 14. This energy is dissipated by snubber network 17, comprising a diode 24, a capacitor 25 and a resistor 26, thereby protecting transistor 16 from potentially damaging voltage stresses.

Energy transferred to secondary windings 20, 21, 22 and 23, shown in the FIGURE as winding segments of a single, multi-tapped winding, induces voltages across each of the windings which are rectified and filtered by associated diodes and capacitors to provide direct voltage supplies which are used to power various receiver load circuits. For example, winding 20 provides a voltage of the order of 127 volts at a terminal 30, winding 21 provides a voltage of the order of +24 volts at a terminal 31, winding 22 provides a voltage of the order of +16.5 volts at a terminal 32, and winding 23 provides a voltage of the order of −16.5 volts at a terminal 33.

The 127 volt supply at terminal 30 is applied via a primary winding 34 of a high voltage transformer 35 to a horizontal deflection circuit 36. Horizontal deflection circuit 36, comprising a horizontal output switching transistor 37, a retrace capacitor 40, a damper diode 41, a horizontal deflection yoke winding 42 and an S-shaping capacitor 43, produces a horizontal deflection current in deflection yoke winding 42. The deflection current produces a time-varying magnetic field in the vicinity of the deflection yoke winding 42, which is placed on the neck of a television kinescope (not shown). This time-varying magnetic field acts to produce the desired deflection or scan of the kinescope electron beam or beams.

Operation of horizontal output switching transistor 37 is controlled by switching signals applied to its base from a horizontal driver circuit 44, which is also shown as being powered from the 127 volt supply. Proper timing of switching signals for transistor 37 is provided by horizontal oscillator 45, shown as being powered from the +16.5 volt supply.

Periodic current flow through primary winding 34 of high voltage transformer 35 induces a voltage across high voltage winding 46, which produces an ultor voltage of the order of 25 KV at a terminal 47 that is applied to the kinescope high voltage terminal (not shown). A voltage is also induced across a secondary winding 50 of high voltage transformer 35 which is rectified and filtered by an associated diode and capacitor to provide a direct voltage of the order of +230 volts at a terminal 51, which may be used, for example, to power the kinescope electron beam drive circuits (not shown).

By controlling the conduction time of switching transistor 16, and hence the amount of stored energy in primary winding 14, the level of the supply voltages generated by secondary windings 20, 21, 22 and 23 can also be controlled or regulated. This is accomplished by a regulator control circuit 52, such as an integrated circuit AN5900 manufactured by Matsushita Electric Corp., which senses one or more of the supply voltages and produces a pulse width modulated drive signal to the base of switching transistor 16 via drive circuit 53. The sensed voltage for regulator control circuit 52 is derived from the 127 volt supply, which, as previously described, is used to generate the kinescope high voltage and power the horizontal deflection circuit 36. Drive circuit 53 incorporates an isolation transformer, which, together with transformer 15, povides an electrical isolation between the receiver load circuits and the ac mains supply to facilitate receiver interfacing with external program source and reproduction components.

When the kinescope electron beam current increases, e.g., the receiver brightness control is turned up or the picture scene brightness increases, the number of electrons striking the kinescope anode increases. The current path to ground for these electrons is through high voltage winding 46. This increased current flow increases energy losses in winding 46 due to leakage inductance and resistance losses, resulting in a decrease in the high voltage level, which produces a smaller accelerating potential for the kinescope electron beams. The electrons therefore require a greater length of time to reach the screen, resulting in a larger scanned area for a given deflection field strength. If compensation is not provided with respect to the deflection field, i.e., deflection current, the raster displayed on the kinescope display screen will appear to undesirably grow and shrink in response to changes in brightness level.

An increase in the energy loss in high voltage winding 46 is reflected back to primary winding 34 requiring a corresponding increase in current flow in primary winding 34. The increase in current must be provided from the 127 volt supply. Accordingly, an increase in kinescope beam current will result in an increased loading on the 127 volt supply which will cause an increase in the ac ripple component of the rectified and filtered voltage at terminal 30. In accordance with the present invention, the sensing feedback path from the +127 volt supply to regulator control circuit 52 incorporates a peak detector 69 including a diode 55 and a capacitor 62 for sensing the peak level of the voltage derived from the 127 volt supply and applying that voltage to regulator control circuit 52. Since the amount of ac ripple in the 127 volt supply is determined by the value of filter capacitor 54, capacitor 54 is selected to ensure that an appropriate amount of ac ripple will be produced when the beam current exceeds a predetermined threshold such that the corrective effects provided by the present invention occur in a desired manner.

A voltage divider network 59, comprising resistor 60 and parallel connected resistors 61, 63, 64 and 65 in the sensing feedback path provides several functions. One function is that of providing the correct level of input voltage required by regulator 52. Voltage divider 59 also reduces the amplitude of the sensed voltage supplied to the peak detector 69 from the +127 volt supply at terminal 30 to a level sufficiently low such that only a low voltage capacitor 62 is required. If peak detector diode 55 and capacitor 62 were located ahead of voltage divider 59, a larger voltage capacitor would be required. Voltage divider 59 also functions in conjunction with capacitor 62 of peak detector 69 to determine the response time of the voltage regulation loop. Accordingly, the value of capacitor 62 must be selected as a compromise between that value desired for detection of the peak value of the ripple component of the +127 volt supply and that value required for a sufficiently fast response time for normal voltage regulation. The values of parallel connected resistors 61, 63, 64, 65 are selected so that one or more of the resistors may be removed to establish the sensed voltage which results in regulation of the supply voltage at terminal 30 to the desired level, i.e., 127 volts.

If the previously designated AN5900 integrated circuit is utilized, as shown in the FIGURE, the cathode of diode 55 is coupled to its input pin 2. The AN5900 integrated circuit requires a reference voltage applied to pin 1. As shown, this reference voltage is provided from the +16.5 volt supply via a resistor 71 and a Zener diode 70, bypassed by a capacitor 72 to ground. With this arrangement, capacitor 62 should be returned to the reference voltage terminal pin 1. A resistor 73 is connected between pins 1 and 2 of regulator control circuit 52 to provide a discharge path for capacitor 62 and to aid in start-up operation.

Regulator control circuit 52 operates to maintain the peak voltage of the 127 volt supply constant at 127 volts. The previously described increase in ac ripple of the 127 volt supply voltage due to increased beam current causes the average dc value of the supply voltage to decrease slightly, for example, to approximately 124 volts, which results in a decrease in the dc supply voltage for horizontal deflection circuit 36. This decrease in supply voltage causes a decrease in the deflection current amplitude generated by deflection circuit 36 and hence a decrease in the amount of electron beam deflection, thereby compensating for the previously described decrease in the high voltage level. A further decrease in the high voltage level due to a decrease in the average value of the B+ supply voltage does not cause any undesirable effect, since the electron beam scan is more sensitive to changes in the 127 volt supply voltage than to changes in the high voltage level. The proper selection of capacitance values for the filter and supply capacitors associated with the secondary load circuit voltage supplies of transformer 15 will substantially eliminate any undesirable changes in the levels of these supply voltages due to increased ac ripple in the regulated 127 volt supply. The secondary load circuit supplies are essentially regulated with respect to the peak voltage level of the regulated B+ supply. Since this level is regulated and maintained substantially constant, there is no substantial change in the voltage supply levels of the secondary voltage supplies of transformer 15 as the electron beam current changes.

The present invention additionally provides protection for the receiver under severe supply loading conditions, such as picture tube arcing. Under those conditions, the average dc supply voltage will decrease significantly, thereby reducing electrical stresses on receiver components, such as the horizontal output transistor.

What is claimed is:

1. A television receiver incorporating means for providing a plurality of load circuit voltage supplies including means for deriving a high voltage level from one of said load circuit voltage supplies, said high voltage level subject to reduction in response to a receiver operating characteristic, said receiver operating characteristic also loading said one of said load circuit voltage supplies, therefore producing an ac ripple component in the voltage level of said one of said load circuit voltage supplies, said receiver comprising:

a deflection circuit energized by said one of said load circuit voltage supplies for providing an electron beam deflection current, the level of said current determined by the average dc level of the voltage of said one of said load circuit voltage supplies;

control means responsive to a voltage level for controlling the operation of said voltage supply providing means in order to maintain the voltage levels of said voltage supplies substantially constant; and means coupling said one of said load circuit voltage supplies to said control means comprising detector means for providing a voltage level to said control means representative of the peak level of the voltage of said one of said load circuit voltage supplies, such that said average dc level of the voltage of said one of said load circuit voltage supplies decreases in response to the presence of said ac ripple component to compensate said electron beam deflection current for said reduction in said high voltage level.

2. The arrangement defined in claim 1, wherein said means for providing a plurality of load circuit voltage supplies comprises:

a source of ac supply voltage;

means coupled to said source of ac supply voltage for developing a source of unregulated dc voltage;

a first transformer comprising a primary winding coupled to said source of unregulated dc voltage and to said control means, and at least one secondary winding; and means coupled to said secondary winding of said first transformer for providing at least one load circuit voltage supply.

3. The arrangement defined in claim 2, wherein said transformer provides electrical isolation between said source of ac supply voltage and said load circuit voltage supply.

4. The arrangement defined in claim 2, wherein said one load circuit voltage supply comprises a horizontal deflection circuit voltage supply.

5. The arrangement defined in claim 2, wherein said means for providing at least one load circuit voltage supply comprises:

a second transformer having a primary winding coupled to said load circuit voltage supply and having at least one secondary winding; and means coupled to said secondary winding of said second transformer for providing at least one additional load circuit voltage supply.

6. The arrangement defined in claim 5, wherein said one additional load circuit voltage supply comprises a kinescope high voltage supply.

7. The arrangement defined in claim 2, wherein said control means comprises a pulse width modulator circuit for controlling the flow of current from said source of unregulated dc voltage through said primary winding of said first transformer.

8. The arrangement defined in claim 1, wherein said detector means comprises a diode poled for conducting current from said one of said load circuit voltage supplies to said control means and a capacitor coupled from a terminal located between said diode and said control means to a point of reference potential.

9. The arrangement defined in claim 1, wherein said receiver operating characteristic comprises increasing electron beam current.

10. The arrangement defined in claim 1, wherein said means coupling said one of said load circuit voltage supplies to said control means comprises a voltage divider for controlling the level of the voltage supplied to said control means in order to control the voltage levels of said voltage supplies.

11. The arrangement defined in claim 10, wherein said voltage divider comprises a plurality of resistors, the selective exclusion of one or more of said resistors from electrical connection to said control means being effective to adjust the voltage level of said voltage supplies.

12. The arrangement defined in claim 10, wherein said detector means is disposed between said voltage divider and said control means.

* * * * *

UNITED STATES PATENT AND TRADEMARK OFFICE
CERTIFICATE OF CORRECTION

PATENT NO. : 4,525,739

DATED : June 25, 1985

INVENTOR(S) : William Vincent Fitzgerald

It is certified that error appears in the above-identified patent and that said Letters Patent is hereby corrected as shown below:

On the title sheet, the following should be inserted under [56], References Cited, OTHER PUBLICATIONS -- Magnavox Chassis Schematic 19C1 --.

Column 4, line 22, that portion reading "127" should read -- +127 --.

Signed and Sealed this

Twelfth Day of November 1985

[SEAL]

Attest:

DONALD J. QUIGG

*Attesting Officer*

*Commissioner of Patents and Trademarks*